(12) United States Patent
Eberhard et al.

(10) Patent No.: US 10,464,665 B2
(45) Date of Patent: Nov. 5, 2019

(54) BOTTOM ABUTMENT DEVICE FOR A ROTORCRAFT ROTOR, A ROTORCRAFT ROTOR, AND A ROTORCRAFT

(71) Applicant: AIRBUS HELICOPTERS, Marignane (FR)

(72) Inventors: Alain Eberhard, Velaux (FR); Fabien Massal, Saint Savournin (FR)

(73) Assignee: AIRBUS HELICOPTERS, Marignane (FR)

( * ) Notice: Subject to any disclaimer, the term of this patent is extended or adjusted under 35 U.S.C. 154(b) by 377 days.

(21) Appl. No.: 15/377,647

(22) Filed: Dec. 13, 2016

(65) Prior Publication Data

US 2017/0210465 A1 Jul. 27, 2017

(30) Foreign Application Priority Data

Jan. 20, 2016 (FR) ...................................... 16 00098

(51) Int. Cl.
 *B64C 27/32* (2006.01)
 *B64C 27/08* (2006.01)
 *B64C 27/41* (2006.01)
(52) U.S. Cl.
 CPC ............ *B64C 27/322* (2013.01); *B64C 27/08* (2013.01); *B64C 27/41* (2013.01)
(58) Field of Classification Search
 CPC ....... B64C 27/32; B64C 27/41; B64C 27/322; B64C 27/35
 See application file for complete search history.

(56) References Cited

U.S. PATENT DOCUMENTS

| 4,289,448 | A | | 9/1981 | Declerco et al. |
| 4,749,339 | A | | 6/1988 | Mouille et al. |
| 5,007,799 | A | | 4/1991 | Mouille et al. |
| 5,267,833 | A | | 12/1993 | Mouille |
| 5,316,442 | A | | 5/1994 | Mouille |
| 5,588,801 | A | * | 12/1996 | Commelin ............ B64C 27/322 416/140 |
| 6,203,277 | B1 | * | 3/2001 | Legendre .............. B64C 27/322 416/104 |

FOREIGN PATENT DOCUMENTS

| EP | 0360688 | 3/1990 |
| FR | 2671049 | 7/1992 |

OTHER PUBLICATIONS

French Search Report for French Application No. FR 1600098, Completed by the French Patent Office, dated Aug. 30, 2016, 6 Pages.

* cited by examiner

*Primary Examiner* — Dwayne J White
*Assistant Examiner* — Jackson N Gillenwaters
(74) *Attorney, Agent, or Firm* — Brooks Kushman P.C.

(57) ABSTRACT

A bottom abutment device for a rotor having a plurality of lift assemblies. The bottom abutment device comprises at least one abutment track per lift assembly. The bottom abutment device comprises a plate with a ring and one branch per lift assembly. The bottom abutment device has a plurality of supports, each support fastenable to a rotary member of the rotor, each support extending in part in an opening in a branch, the supports giving the plate a restricted degree of freedom to move in translation, the supports giving the plate at least one restricted degree of freedom to move in rotation about the axis of symmetry.

20 Claims, 4 Drawing Sheets

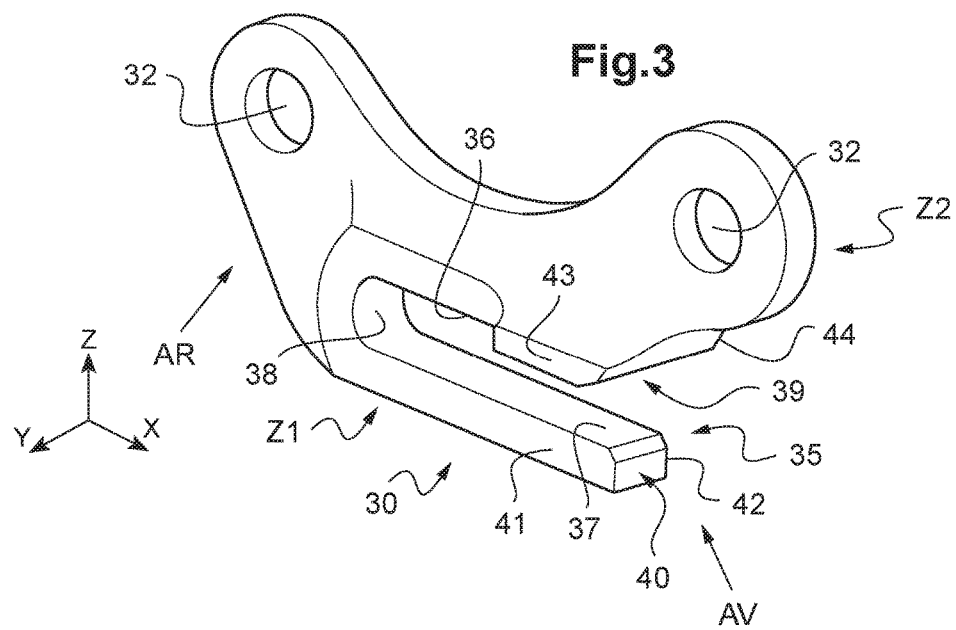
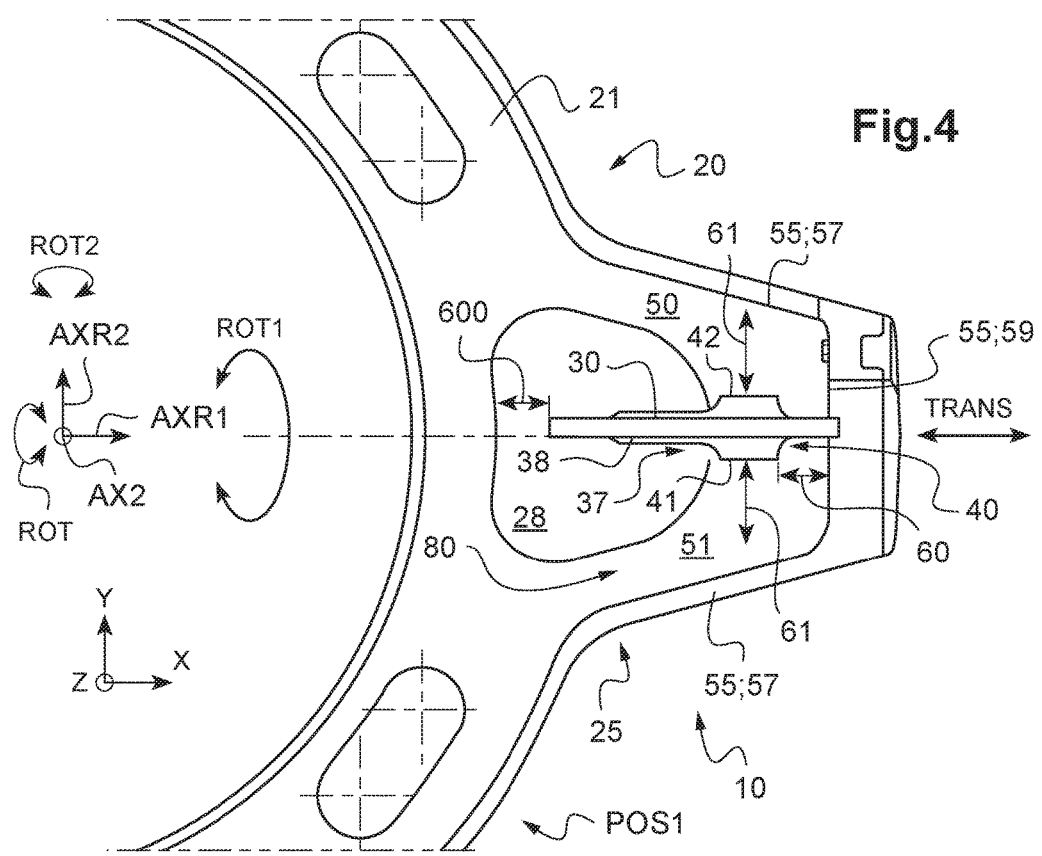

BOTTOM ABUTMENT DEVICE FOR A ROTORCRAFT ROTOR, A ROTORCRAFT ROTOR, AND A ROTORCRAFT

CROSS REFERENCE TO RELATED APPLICATION

This application claims priority to French patent application No. FR 16 00098 filed on Jan. 20, 2016, the disclosure of which is incorporated in its entirety by reference herein.

BACKGROUND OF THE INVENTION (1) Field of the Invention

The present invention relates to a bottom abutment device for a rotorcraft rotor, to a rotorcraft rotor having the bottom abutment device, and to a rotorcraft provided with such a rotor.

The invention is thus situated in the technical field of rotorcraft rotors. More specifically, the invention is situated in the field of abutments fitted to such rotors in order to limit the flapping movement of lift assemblies carried by the rotor.

(2) Description of Related Art

Specifically, a rotorcraft usually has at least one lift rotor. The lift rotor contributes to providing the rotorcraft at least with lift and possibly also with propulsion.

A lift rotor may comprise a hub that is rotated by a mast. The hub then carries at least two lift assemblies. Consequently, each lift assembly has a blade that is connected to the hub by at least one retention and mobility member. In particular, each blade may comprise a lift element fastened to a cuff, or indeed it may comprise a lift element having an incorporated cuff.

For example, a retention and mobility member may include a hinge referred to as a "spherical abutment". Each spherical abutment may have one strength member fastened to the hub and another strength member fastened to a cuff, the cuff being optionally incorporated in a lift element.

The retention and mobility members are fitted to respective ones of the blades at their roots in order to allow them to be moved by an operator. By way of example, mounting blades so that they are movable relative to the hub enables a pilot of the rotorcraft in flight to give rise to collective or cyclic variations in the pitch of the blades so as to influence the behavior of the rotorcraft with respect to its lift and/or propulsion.

The ability of the blades to move relative to the hub allows them to move with lead/lag movements, with pitch movements, and with upward and downward flapping movements. The notions of "up" and "down" should be considered in the direction in which the axis of rotation of the rotor extends. When the rotor is rotating at nominal speed, the blades are spontaneously taken upwards under the effects of centrifugal force and of the lift that they generate. When the rotor is stopped, the blades are subjected only to the force of gravity and they are therefore naturally taken downwards under the effect of their weight.

A rotor is thus commonly fitted with an abutment mechanism for limiting the flapping movement of the blades, in particular under the effect of forces external to the rotorcraft.

In one embodiment, the abutment mechanism may comprise, for each lift assembly, both a bottom abutment device and a top abutment device. A bottom abutment device is also known as a "bottom abutment" or "butée basse" in French language and a top abutment device is also known as a "top abutment" or "butée haute" in French language.

The bottom abutment device and the top abutment device respectively include a bottom abutment member and a top abutment member. The bottom abutment member and the top abutment member form obstacles to the individual flapping paths of the blades, respectively downwards and upwards. Furthermore, the bottom abutment device and the top abutment device include respective bottom and top abutment tracks carried by each lift assembly. For example, a strength member of a spherical abutment carries an abutment track in the form of a stop skid.

In the event of a blade performing excessive flapping movement, an abutment track comes into contact with an abutment member, thereby limiting the flapping movement of the blade.

The abutment mechanism serves in particular to limit the flapping movement of each lift assembly while starting the rotor, and more particularly when in the presence of wind. The abutment mechanism may also limit the flapping of the blades during an operation of folding the blades. In particular in the presence of spherical abutments hinging a blade to a hub, the abutment mechanism tends to preserve the spherical abutment when on the ground by avoiding a flapping movement of a blade in the absence of centrifugal force giving rise to the component elements making up the spherical abutment becoming mutually separated.

A known bottom abutment device comprises a bottom abutment member in the form of a bottom abutment ring. The bottom abutment ring is common to all of the lift assemblies. The bottom abutment ring is arranged around the axis of rotation of the rotor. Such a bottom abutment ring is then referred to as a "reciprocating" ring or "anneau réciproque" in French language.

The low abutment ring is movable only radially in a U-shaped groove of a retention ring.

On the ground, while rotating at low speed, or when stopped, the lift assemblies come simultaneously into contact with the low abutment ring, thereby mutually preventing one another from moving.

Document FR 2 671 049 describes a bottom abutment ring that slides radially in yokes. The yokes are arranged so as to allow the bottom abutment ring the possibility of limited movement in the plane of the abutment ring.

That bottom abutment device is advantageous, but it can be difficult to arrange on certain rotors.

Specifically, the pitch of the blades may be controlled by a pilot by means of pitch rods. The pitch rods extend substantially parallel to the axis of rotation of the rotor, extending upwards in elevation from a set of controlling swashplates to the blades.

The pitch rod of a blade may be arranged close to the axis of rotation of the rotor so as to be situated on the flapping axis of the blade, for example. Such an arrangement tends to avoid coupling between the flapping movements and the pitch movements of the blade.

Unfortunately, a bottom abutment ring may present a diameter that is large in order to be capable of facing the corresponding abutment track. Such a large-diameter droop restrainer ring runs the risk of coming into contact with a pitch rod.

In order to remedy that problem, the diameter of the bottom abutment ring may be minimized. Under such circumstances, the corresponding abutment track is mounted on a connection member that is elongate in order to cause the bottom abutment ring and the abutment track to face each other. When the blade is performing rotary movements, in particular about its pitch axis, the connection member then runs the risk of coming into contact with the pitch rod.

In order to avoid such interference, the bottom abutment ring can be replaced by a star-shaped plate.

Document EP 0 360 688 describes a bottom abutment member having such a star-shaped plate. The plate then has a central ring surrounding a circular opening.

The plate also has one radial branch per rotor blade. Each radial branch extends from an outer periphery of the central ring parallel to a radius of the central ring. Each branch presents a plane shape that is substantially rectangular and that is of thickness that is substantially constant. A metal contact shoe is removably mounted by a bolted connection to the outer radial end of each branch. The shoe constitutes a wear part that is to come into contact with a low abutment track of a blade.

The plate can be moved radially within a body of revolution. The body of revolution is fastened about the axis of rotation of the rotor inside the rotor mast. The body of revolution defines an annular U-shaped housing that is radially open towards the rotor mast.

The central ring is then held within the housing, with each branch of the plate passing through an opening in the mast in order to project towards an abutment track of a blade.

The U-shaped housing is defined by a bottom annular support plate that is extended in elevation by a tubular chimney opening out at a collar. A top annular support plate is then bolted to the collar. The central ring thus rests on the bottom annular support plate, with an elastically deformable annulus being adhesively bonded to the central ring and to the top annular support plate.

The central ring can then move radially in its plane about an equilibrium position. The amplitude of such radial movements is nevertheless limited by the chimney. In addition, the elastically deformable annulus tends to return the plate into its equilibrium position when the central ring moves away from the equilibrium position.

The use of a star-shaped plate is found to be advantageous for avoiding interference with the pitch rods. The plate may have a central ring of small diameter. In addition, the branches make it possible to place the shoes for interrupting flapping of a blade at a distance from the axis of rotation. Under such circumstances, the blade does not require the use of an elongate connection member of large size that is large and would therefore run the risk of interfering with the pitch rod.

However, document EP 0 360 688 proposes arranging the plate within a rotor mast. It can be difficult to remove such a plate.

Documents U.S. Pat. Nos. 5,316,442, 4,289,448, and 4,749,339 are also known.

BRIEF SUMMARY OF THE INVENTION

An object of the present invention is thus to propose an alternative abutment device.

The invention thus provides a bottom abutment device for a rotor having a plurality of lift assemblies for rotating about an axis of rotation. The bottom abutment device comprises at least one abutment track per lift assembly, each abutment track being for fastening to a lift assembly. The bottom abutment device comprises a plate with a ring extending circumferentially around an axis of symmetry, the plate having one branch per lift assembly, each branch extending radially from the ring towards a free end. Each abutment track faces a free end in order to come into abutment against the free end under predetermined conditions, for example, in the event of predetermined flapping of a plurality of lift assemblies. Interference between an abutment track and a free end can tend to limit flapping movement of a lift assembly under such predetermined conditions.

Furthermore, the bottom abutment includes a plurality of supports, each support comprising fastener means for fastening to a rotary member of the rotor, such as a hub, for example. Each support extends in part in an opening of a branch so as to co-operate with the corresponding branch, the opening extending in elevation in a direction parallel to the axis of symmetry of the ring, the supports giving the plate a degree of freedom to move in translation that is restricted by shape interference with the branches, and the supports giving the plate at least one degree of freedom to move in rotation about said axis of symmetry that is restricted by shape interference with the branches.

The term "rotary member" designates a member of the rotor that is movable in rotation about the axis of rotation of the rotor.

The term "one branch per lift assembly" means that the plate has as many branches as the rotor has lift assemblies. Each branch then extends substantially radially in a direction that extends spanwise relative to the corresponding lift assembly.

The bottom abutment device then comprises a star-shaped plate with at least one abutment track carried by each lift assembly. For example, an abutment track may be arranged on a projection from a cuff.

On the ground, each branch of the plate limits downward flapping movement of a lift assembly by interfering with the abutment tracks.

In flight, and like a conventional bottom abutment ring, the plate is free and is not subjected to such stresses insofar as the lift assemblies do not all reach a maximum downward flapping angle at the same time. If a lift assembly is deflected downwards, the diametrically opposite assemblies may tend to be flapping upwards. The observed downward movement of the lift assembly is then not impeded by the plate since it is itself free to move.

The time that has elapsed since publication of Document EP 0 360 688 gives a good indication of the difficulty of arranging such a star-shaped plate.

In the invention, the star-shaped plate is carried by U-shaped members acting as supports. The supports are fastened to a rotary member of the rotor. For example, the supports are easily fastened in reversible manner to a face of a hub. The supports are thus stationary in the reference frame of the rotor.

Each support co-operates with the plate in particular by being arranged in an opening in a branch. The term "each support extends in part in an opening" means that the support passes through the opening in elevation but that it also extends in other directions outside the opening.

The supports thus hold the plate, while nevertheless leaving the plate free to perform restricted movements.

Thus, in flight, when an abutment track strikes a branch, the supports allow the plate to move in translation in the plane in which it extends. Furthermore, the supports allow the plate to move a little in rotation about the axis of symmetry of the plate. The plate can thus move in translation in a plane substantially perpendicular to the axis of rotation of the rotor. Nevertheless, this movement in translation is limited to a predetermined amplitude.

The star shape of the plate thus makes it possible to use a small ring that does not interfere with any of the pitch rods, it being possible for the branches to be retracted by movement of the ring in the event of interference with a pitch rod.

Furthermore, the supports enable the plate to be guided at a plurality of distinct bearing zones, tending to minimize the lever arm between each bearing zone of the plate and the supports.

For example, the bottom abutment device may include one support for each branch in order to optimize guidance.

By increasing the number of supports, it is possible to ensure that the loss of one support is not problematic from a safety point of view. For example, a rotor having five lift elements may have a five-branch plate that is carried by five supports. If one of the supports breaks, the plate continues to be carried by the remaining four supports. Specifically, a manufacturer can design the supports so that the remaining supports can withstand the forces to which they are subjected in the absence of one of the supports.

From a maintenance point of view, the bottom abutment device of the invention is also advantageous. Specifically, each opening may be of dimensions suitable for enabling the corresponding support to be extracted. Under such circumstances, an operator can dismantle the supports, and indeed the ring, relatively easily.

The bottom abutment device may also include one or more of the following characteristics.

Thus, at least one fastener means comprises two elongate members together with two orifices in the support, each elongate member passing through one of the orifices and being designed to pass through a link of said rotor.

For example, the support may have two orifices that are offset radially and/or circumferentially.

Each orifice may have a bolt passing therethrough, which bolt is bolted to an eyelet-forming link of the hub.

Furthermore, these supports may give said plate three degrees of freedom to move in restricted manner in rotation respectively about said axis of symmetry and about two "horizontal" axes that are perpendicular to each other and perpendicular to said axis of symmetry.

These degrees of freedom may in particular reduce the forces exerted on the plate and allow the plate to move in operation.

Furthermore, each support may include a radially-open U-shaped housing, the housing being defined by a top wall and by a bottom wall of the support that are connected together by an end wall of the support extending in elevation, each end wall being arranged in said opening of a branch, the top wall and the bottom wall extending in elevation respectively above and below said branch.

The term "in elevation" refers to a direction that is substantially parallel to the axis of symmetry of the plate and/or to the axis of rotation of the rotor.

The support may then be in the form of a mechanical part that is relatively simple. The housing is open radially and circumferentially. In radial section, the housing is thus U-shaped. With the support extending longitudinally from back to front, the open radial clearance section of the housing is located at the front of the support.

This U-shape of the housing makes it easy to insert the support in the opening merely by performing a tilting operation.

Furthermore, this U-shape makes it possible to define a housing that enables the plate to be guided both in translation and in rotation.

A movement in translation of the plate in one direction can then be stopped when the branch comes into contact with the end wall of the support and/or with a front face of the support.

Optionally, a branch co-operating with a support has a plane body, the plane body extending in elevation from a bottom face facing a bottom wall of a support towards a top face facing the top wall of that support, the branch having at least one rim projecting in elevation from the plane body in order to limit a degree of freedom to move of the ring by shape interference.

The plane body may be in the form of a web presenting small thickness between its bottom face and its top face. This characteristic serves to optimize the weight of the plate.

In order to stiffen the branch, the branch includes at least one thicker rim.

Furthermore, a rim may come into contact with the support as a result of the plate moving in translation or in rotation.

In position, a branch may include at least one rim referred to as a "tangential" rim for limiting movement in translation of the plate, radial clearance lies between a support and each corresponding tangential rim when the axis of symmetry of the plate coincides with an axis of rotation of the rotor.

For example, each tangential rim may be arranged at an end zone of the branch, the end zone including the free end of the branch. Optionally, the top face and the bottom face of a branch have a tangential rim in order to distribute the forces exerted on the support and on the branch.

A movement in translation of the plate can then be stopped when the support comes into contact with a tangential rim.

Furthermore, a branch may have at least one pair of rims referred to as "circumferential" rims arranged circumferentially on either side of abutment walls of a support in order to limit the amplitude of movement in rotation for the plate about said axis of symmetry, circumferential clearance lying between a support and at least one circumferential rim of a pair.

The term "circumferentially arranged" refers to a circle centered on the axis of symmetry of the plate and passing through the circumferential rims.

A movement in rotation of the plate about its axis of symmetry can then be stopped when the support comes into contact with a circumferential rim.

Optionally, the top face and the bottom face of a branch include a pair of circumferential rims so as to distribute the forces exerted on the support and on the branch.

In an embodiment, the plane body comprises:

a tangential rim referred to as a "top" tangential rim extending in elevation upwards from said top face, and a pair of circumferential rims referred to as "top" circumferential rims extending in elevation upwards from the top face, the top tangential rim being radially in alignment with the top wall of the support, and the top circumferential rims being arranged circumferentially on either side of the top wall; and a tangential rim referred to as a "bottom" tangential rim extending downwards in elevation from the bottom face, and a pair of circumferential rims referred to as "bottom" circumferential rims extending downwards in elevation from the bottom face, the bottom tangential rim being in alignment with the bottom wall of the support, and the bottom circumferential rims being arranged circumferentially on either side of the bottom wall.

Furthermore, clearance in elevation may lie between each support and the corresponding branch.

This clearance in elevation may serve in particular to leave the plate free to move in rotation about three axes. Furthermore, the clearance serves to limit contact between the support and the plate and makes it easier to put the support into place.

Under such circumstances, the maximum clearance in elevation between the plane body and a support may be less than the height of a rim in elevation.

The term "maximum clearance in elevation" relates to the greatest clearance between the support and the body in a direction substantially parallel to the axis of rotation.

This characteristic makes it possible to guarantee that the support does not pass over a rim as a result of the plate moving.

In another aspect, the ring is perforated between two branches.

This characteristic serves to minimize the weight of the plate.

Furthermore, at least one branch includes a wear shoe removably mounted on a free end.

After it has made repeated contacts with an abutment track, the wear shoe, which constitutes a wear part, can be replaced during a maintenance operation.

Furthermore, the plate is for occupying a middle position in the absence of contact with an abutment track, the supports giving said plate a degree of freedom to move in translation perpendicularly to said axis of rotation that is restricted to an amplitude of plus or minus 12 centimeters (cm) about the middle position, the supports giving the plate a degree of freedom to move in rotation about the axis of symmetry that is restricted to plus or minus 5 degrees (°) about the middle position.

In addition to a bottom abutment device, the invention provides a rotor having a plurality of lift assemblies.

The rotor includes a bottom abutment device of the type described above, each lift assembly carrying at least one abutment track, each support being constrained in rotation with a rotary member of the rotor, the plate being carried by the supports.

Optionally, the rotor includes a hub carrying the lift assemblies, and said rotary member is the hub.

Furthermore, the rotor may include at least three lift assemblies.

The invention also provides an aircraft including such a rotor.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 3 is a view of a support of such a bottom abutment device;

FIG. 4 is a view of a support engaged in an opening of a branch of a plate of a bottom abutment device;

DETAILED DESCRIPTION OF THE INVENTION

Elements present in more than one of the figures are given the same references in each of them.

Figure 1:
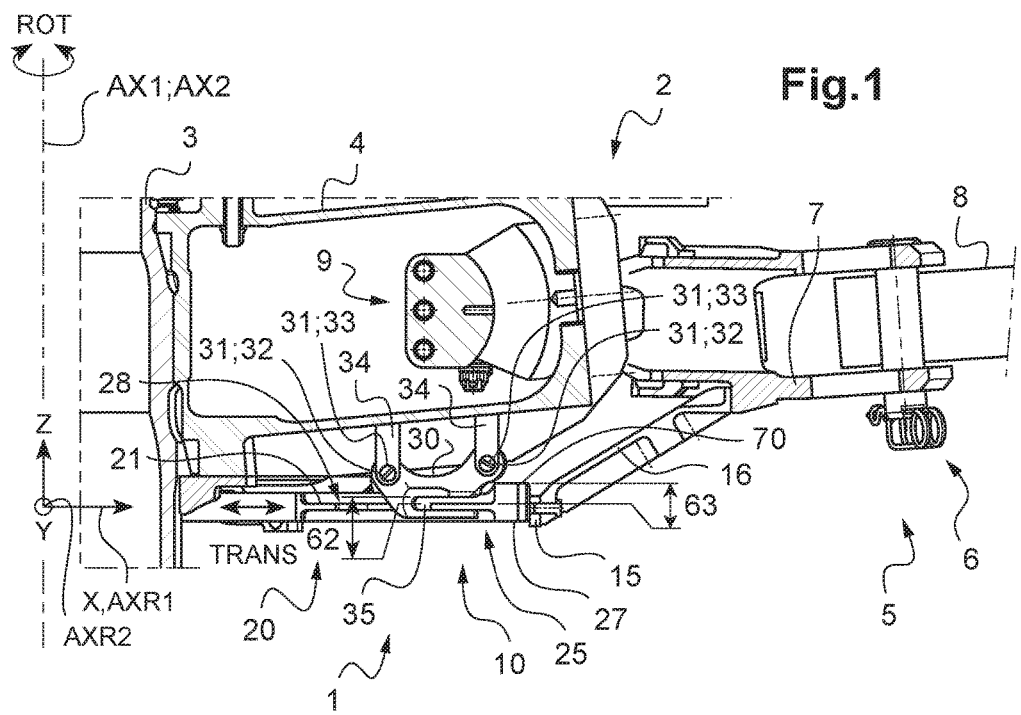
FIG. 1 is a view of an aircraft rotor provided with a bottom abutment device of the invention.
Figure 2:
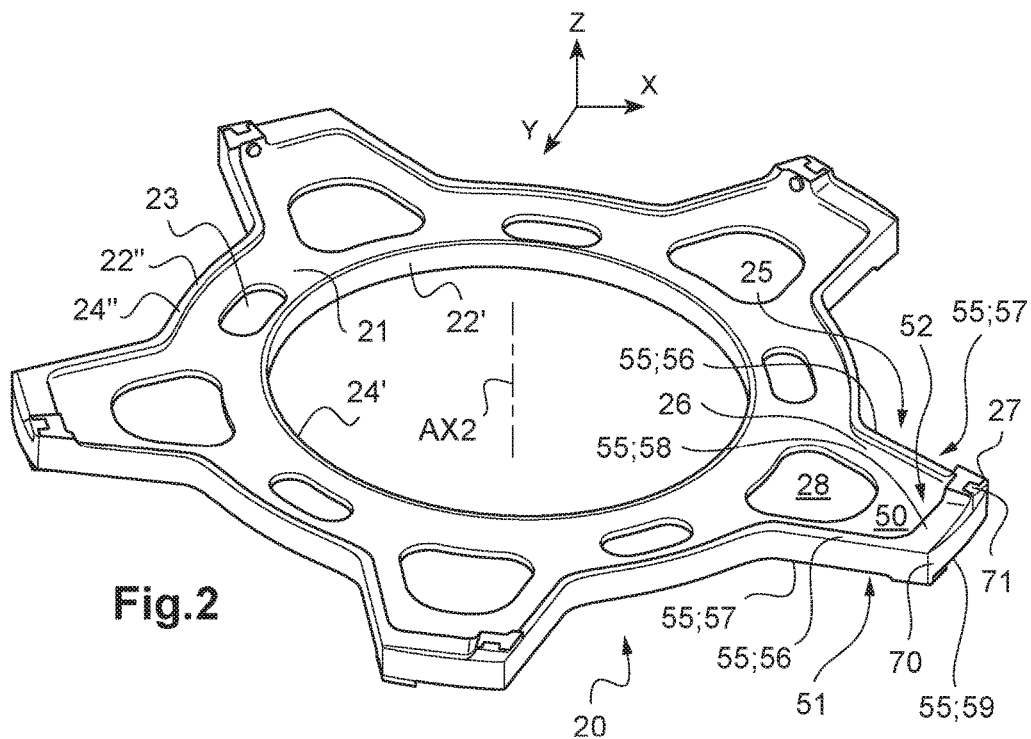
FIG. 2 is a view of a plate of such a bottom abutment device.

It should be observed that three mutually orthogonal directions X, Y, and Z are shown in FIGS. 1 and 2.

These three directions include a first direction X, a second direction Y, and a third direction Z that is said to be "in elevation".

The term "in elevation" relates to any direction parallel to the third direction Z. The terms "transversely" and "radially" relate to directions perpendicular to the elevation direction.

The term "circumferentially" refers to a circle centered on an axis of the member in question.

The terms "low" and "high", "bottom" and "top", are relative terms to be considered relative to a direction in elevation, such as the gravity direction when on the ground.

FIG. 1 shows an aircraft 1.

In particular, the aircraft 1 has a rotor 2. For example, the aircraft 1 is a rotorcraft, the rotor 2 being a rotor contributing at least in part to providing the aircraft with lift and/or with propulsion.

The rotor 2 may comprise a hub 4 that is rotated by a rotor mast 3 about an axis of rotation AX1.

Furthermore, the rotor 2 comprises a plurality of lift assemblies 5 carried by the hub 4. By way of example, the rotor 2 has at least three lift assemblies 5.

Each lift assembly 5 possesses a blade 6 comprising a lift element 8 and a cuff 7. The cuff may be pinned to the lift element or it may be integral with the lift element.

In addition, each lift assembly 5 may include a retention and mobility member 9 fastened to the cuff 7 and to the hub 4. The retention and mobility member 9 may include a spherical abutment, for example.

Furthermore, the rotor 2 has a bottom abutment device 10 for limiting downward flapping of the lift assemblies on the ground. This bottom abutment device 10 is a device of the droop restrainer ring type.

Under such circumstances, the bottom abutment device 10 has at least one abutment track 15 for each lift assembly 5.

Each lift assembly 5 thus has at least one abutment track 15. For example, a cuff includes a projection 16 extending downwards and towards the axis of rotation AX of the rotor. Each abutment track 15 is then arranged removably on the projection 16.

Furthermore, the bottom abutment device 10 has a star-shaped plate 20. This plate 20 may be referred to as a reciprocating plate, by analogy with prior art reciprocating rings.

The plate 20 comprises a ring 21 that extends circumferentially around an axis of symmetry AX2. The plate 20 also has one branch 25 for each lift assembly 5. Each branch 25 extends radially from the ring 21 towards a free end 27 in a direction going towards the abutment track of the associated lift assembly.

When all of the lift elements bear against the plate, the axis of symmetry AX2 coincides with the axis of rotation AX1. Furthermore, the plate is in a middle position POS1.

This middle position POS1 may also be reached at rest when none of the abutment tracks 15 is bearing against the plate 20.

Furthermore, the bottom abutment device 10 has a plurality of supports 30 carrying the plate 20. For example, the bottom abutment device 10 has one support 30 for each branch 25.

Each support is constrained to rotate with the hub 4, and in operation it is stationary relative to the hub 4.

Under such circumstances, the support 30 includes fastener means 31 suitable for being fastened to a rotary member of the rotor, e.g. to the hub 4. By way of illustration, the fastener means 31 include at least two orifices 32, each arranged through the support 30. Furthermore, the fastener means 31 comprise one elongate member 33 per orifice, such as a bolt or a pin. Under such circumstances, each elongate member 33 passes through an orifice 32 and through a link 34 of the rotor. The link 34 may be in the form of an eyelet in a projection or indeed in the form of a lug of a clevis, for example.

Each support 30 extends in a radial opening 28 in the plate 20 in order to carry the plate 20.

Consequently, the support 30 imparts a limited degree of freedom to the plate 20 to move in translation TRANS, and at least one limited degree of freedom for it to move in rotation ROT about the axis of symmetry AX2.

In particular in flight, the plate 20 is to occupy the middle position POS1 in the absence of contact with an abutment track 15. Under such circumstances, the support 30 gives the plate a degree of freedom to move in translation perpendicularly to said axis of rotation that is restricted to an amplitude of plus or minus 12 cm about the middle position POS1, the supports giving the plate a degree of freedom to move in rotation about said axis of symmetry that is restricted to plus or minus 5° about said middle position POS1.

FIG. 2 is a three-dimensional view of a plate 20 of the invention. The plate may comprise a single piece.

The plate 20 has a ring 21 centered on an axis of symmetry AX2. The ring then extends radially relative to the axis of symmetry AX2 from an inner periphery 22' to an outer periphery 22".

For example, the ring is made from a web having raised and dropped edges 24' pointing upwards and downwards at its inner periphery 22'.

Likewise, the raised and dropped edges 24" extend over a portion of the outer periphery 22" of the ring 21.

In addition, the plate 20 has as many branches 25 as the rotor has lift assemblies. Each branch 25 extends radially from the outer periphery of the ring from an inner end 26 to a free end 27.

At least one branch 25 may include a wear shoe 70 on its free end 27. The wear shoe may be replaceable by being removably mounted on the free end 27, e.g. by using screw-fastener means 71.

Furthermore, at least one branch may include a plane body 50 extending the web of the ring 21 radially. This plane body 50 thus extends both radially and circumferentially, and it also extends in elevation from a bottom face 51 to a top face 52.

In addition, the branch may have at least one rim 55 projecting in elevation from the plane body 50. Each rim of a branch serves to stiffen the branch, and also to limit a degree of freedom of the ring 21 by shape interference with a support 30.

Thus, the branch 25 may be provided with at least one rim 55 referred to as a "tangential" rim 58, 59 for limiting movement in translation of the plate by shape interference with a support.

By way of example, the tangential rim referred to as the "top" tangential rim 58 extends upwards in elevation from the top face 52 of the plane body.

As an alternative, or in addition, a tangential rim referred to as the "bottom" tangential rim 59 extends in elevation downwards from the bottom face 51.

Where appropriate, the top tangential rim 58 is above the bottom tangential rim 59. In section, the top tangential rim 58 together with the bottom tangential rim 59 and the plane body 50 form a structure that is T-shaped.

In addition, a branch 25 may have at least one pair of rims 55 that are referred to as "circumferential" rims 56, 57.

The circumferential rims 56, 57 of a pair are arranged circumferentially on either side of a central dish of the branch, and where applicable of a peripheral rim, relative to a circle centered on the axis of symmetry AX2. The circumferential rims 56 and 57 serve in particular to limit the amplitude of movement in rotation of the plate 20 about the axis of symmetry AX2.

For example, a pair of circumferential rims referred to as "top" circumferential rims 56 extend upwards in elevation from the top face 52. Each top circumferential rim 56 may extend a raised rim of the ring and may be extended by the top tangential rim 58.

Alternatively, or in addition, a pair of circumferential rims referred to as "bottom" circumferential rims 57 extend downwards in elevation from the bottom face 51. Each bottom circumferential rim 57 may extend a raised rim of the ring and may itself be extended by the bottom tangential rim 59.

Where appropriate, a top circumferential rim 56 overlies a bottom circumferential rim 57. In section, the top circumferential rim 56, the corresponding bottom circumferential rim 57, and the plane body form a T-shaped structure.

Furthermore, the ring may be perforated between the two branches 25 so as to present slots 23.

Furthermore, each branch 25 has an opening 28 in elevation passing through the plane body 50 of the branch from its bottom face 51 to its top face 52.

The opening may also pass right through a portion of the ring in its thickness direction.

FIG. 3 shows a support 30 of the invention.

The support 30 may be a single-piece body.

Each support 30 extends longitudinally from a back AR to a front AV, e.g. along a radius of a circle centered on the axis of rotation AX1 of the rotor. In addition, the support extends in elevation from a bottom zone Z1 to a top zone Z2.

The top zone Z2 has the fastener orifices 32.

The bottom zone Z1 includes a U-shaped housing 35. To this end, the bottom zone Z1 may be in the form of a jaw that is connected to the top zone Z2.

The housing 35 is open circumferentially.

Furthermore, the housing 35 is closed radially at a first end by an end wall 38 and opens radially at a second end that is to face the free end of a branch.

Under such circumstances, the housing 35 is defined in elevation by a top wall 36 and a bottom wall 37 of the support 30 that are connected together by the end wall 38 of the support 30.

Furthermore, the support 30 has abutment walls for coming into collision with the rims 55 of the plate 20 in order to limit any movement of the plate relative to a middle position.

Thus, the support 30 has a tangential abutment wall 39 for coming into collision with a tangential rim. Each tangential abutment wall 39 extends a wall defining the housing in elevation.

Thus, a top tangential abutment wall 39 extends the top wall 36 upwards in elevation. Likewise, a bottom tangential abutment wall 40 extends the bottom wall 37 downwards in elevation.

In addition, the support 30 has circumferential abutment walls for coming into collision with a circumferential rim. Each circumferential abutment wall extends a wall defining the housing in elevation.

Thus, two top circumferential abutment walls 43 and 44 extend the top wall 36 in elevation upwards. The two top circumferential abutment walls 43 and 44 are arranged circumferentially on either side of the top wall 36. Likewise, two bottom circumferential abutment walls 41 and 42 extend the bottom wall 37 in elevation downwards. The two bottom circumferential abutment walls 41 and 42 are arranged circumferentially on either side of the bottom wall 37.

Figure 5:
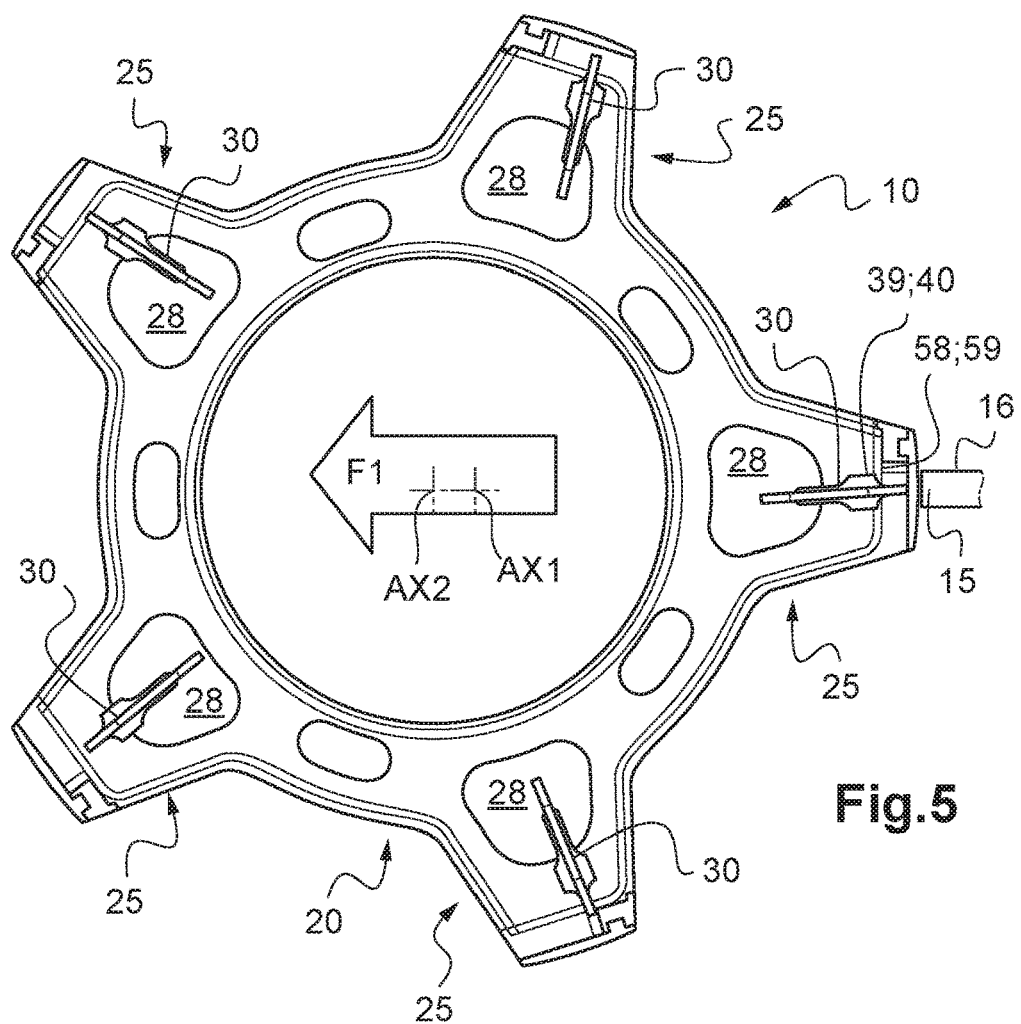
FIG. 5 is a view showing how a plate is blocked against movement in translation by a support.

FIGS. 4 and 5 show how the invention operates.

With reference to FIG. 4, each support 30 is arranged in and around a branch.

Specifically, the end wall 38 of the support is arranged in the opening 28 of the branch 25, passing completely through the opening 28 in elevation.

Furthermore, the top wall 36 and the bottom wall 37 extend in elevation respectively over and under the branch 25, and in particular the plane body 50 of the branch 25. The bottom wall 37 of the support 30 then faces the bottom face 51 of the plane body. The top wall 36 of the support 30 then faces the top face of the plane body.

The top wall 36 and the bottom wall 37 are each present in a dish 80 defined by the rims 55 of the branch.

Consequently, the top tangential rim is radially in alignment with the top wall 36 and the top tangential abutment wall. Likewise, the bottom tangential rim 59 is radially in alignment with the bottom wall 37 and the bottom tangential abutment wall 40.

Furthermore, the top circumferential rims are arranged circumferentially on either side of the top wall and the top circumferential abutment wall. The bottom circumferential rims are arranged circumferentially on either side of the bottom wall 37 and the bottom circumferential abutment walls 41 and 42.

In the middle position POS1, circumferential clearance 61 lies between at least one circumferential rim of the plate and a support 30, and in particular a circumferential abutment wall of the support.

This circumferential clearance 61 may lie between a left bottom circumferential rim 57 and a left bottom circumferential abutment wall 42, and additional circumferential clearance 61 may lie between a right bottom circumferential rim 57 and a right bottom circumferential abutment wall 41.

Likewise, circumferential clearance may lie between a left top circumferential rim and a left top circumferential abutment wall, and additional circumferential clearance 62 may lie between a right top circumferential rim and a right top circumferential abutment wall.

Shape interference between a circumferential abutment wall and a circumferential rim prevents the plate from moving in rotation about the axis of symmetry AX2 as from a predetermined amplitude.

Furthermore, radial clearance 60 lies between a support and each tangential rim 59. This radial clearance then lies between the top tangential abutment wall and the top tangential rim, and also between the bottom tangential abutment wall 40 and the bottom tangential rim 59.

Clearance 600 also lies between the support and the edges of the opening in the plate.

Under such circumstances, each support 30 allows the plate 20 to move in translation TRANS.

In contrast, and with reference to FIG. 5, shape interference between a tangential abutment wall and a tangential rim blocks this movement in translation from a predetermined amplitude.

In addition, and with reference to FIG. 1, maximum clearance in elevation 62 lies between the plane body 50 and each branch of the associated support 30.

This maximum clearance in elevation 62 is less than the height in elevation 63 of a rim 55 so as to guarantee contact between the support 30 and a rim, where necessary, in order to limit movement of the plate relative to the support.

This maximum clearance in elevation 62 may enable a support 30 to give the plate not just one degree of freedom in rotation, but three respective restricted degrees of freedom in rotation ROT about said axis of symmetry AX2, and in rotation ROT1, ROT2 about two axes referred to as "horizontal" axes AXR1, AXR2. The horizontal axes AXR1 and AXR2 are mutually perpendicular and they are perpendicular to the axis of symmetry AX2.

Furthermore, this maximum clearance in elevation 62 makes the support 30 easier to extract.

Figure 6:
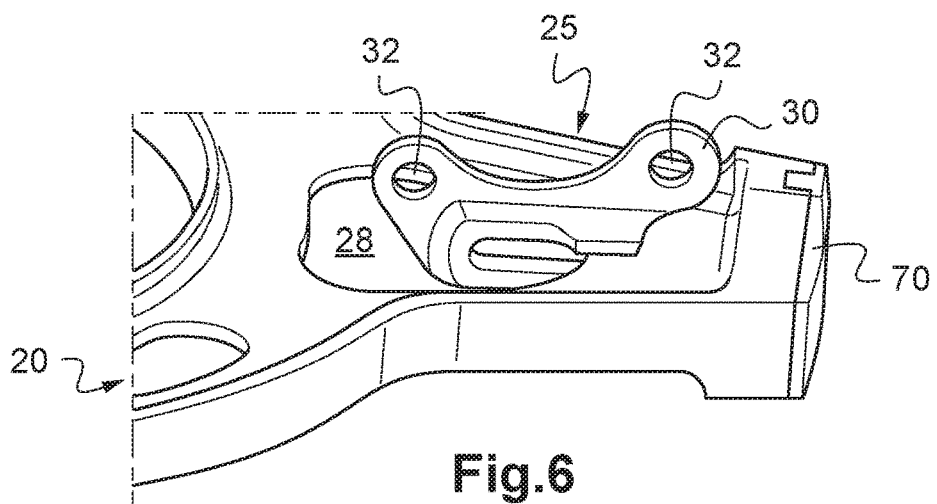
FIGS. 6 to 9 are views showing how a support is extracted.

With reference to FIG. 6, an operator removes the elongate members from the orifices 32 of the support 30.

Figure 7:
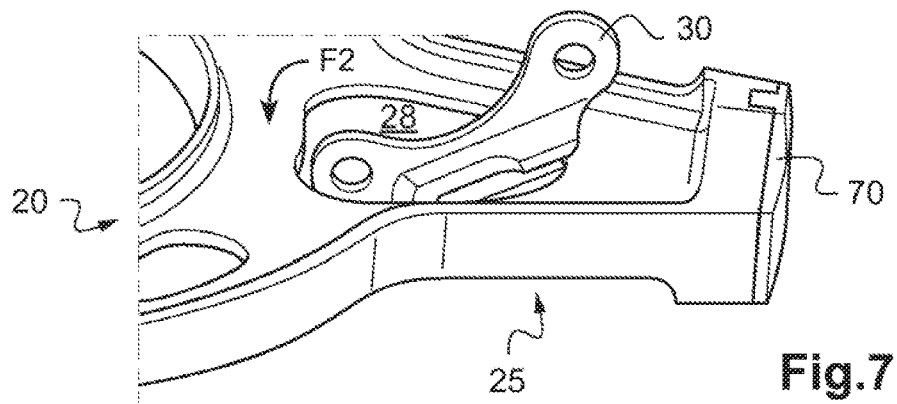

Under such circumstances, and with reference to FIG. 7, the operator tilts the support downwards along arrow F2. This movement is made possible in particular because of the presence of the maximum clearance in elevation and because of the radial clearance between the support and each of the edges of the opening 28.

Figure 8:
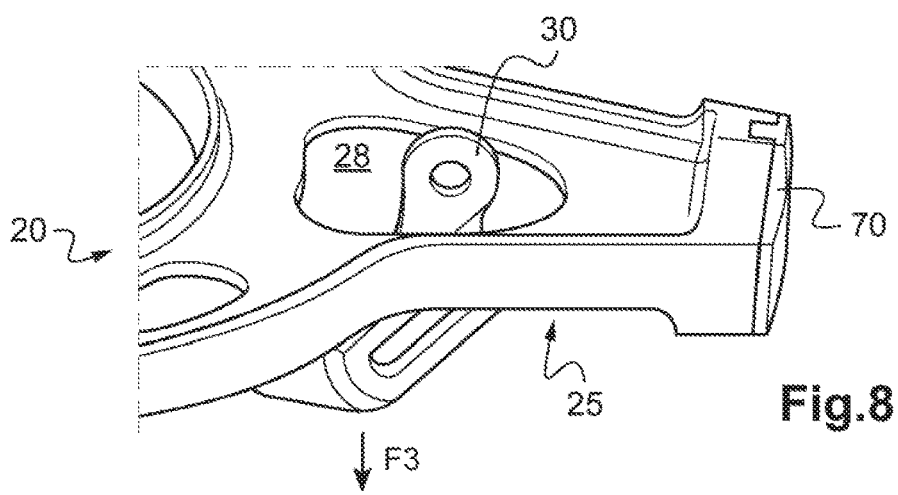

With reference to FIG. 8, the operator pulls the support 30 downwards along arrow F3 in order to extract it from the opening.

Figure 9:
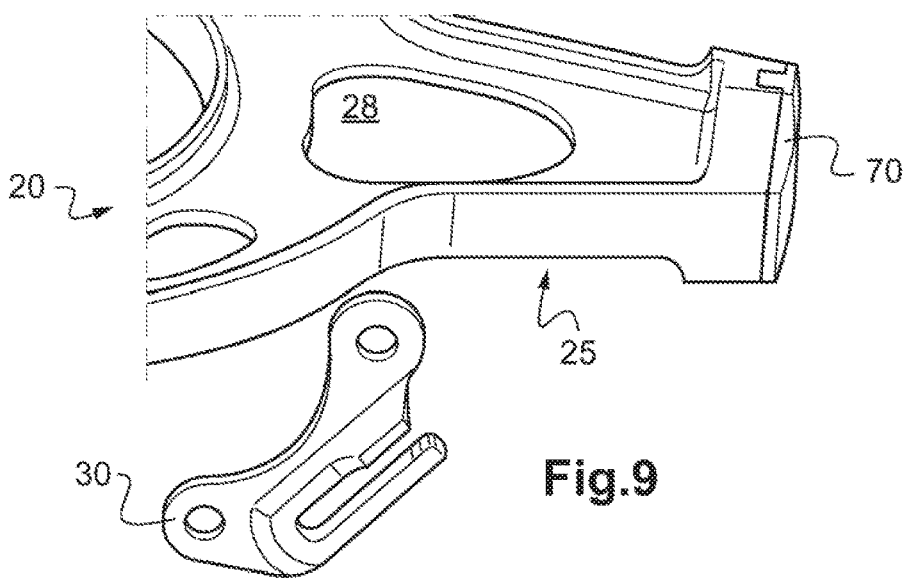

Under such circumstances, and with reference to FIG. 9, the support is easily taken out from the plate.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A bottom abutment device for a rotor having a plurality of lift assemblies for rotating about an axis of rotation (AX1), the bottom abutment device comprising at least one abutment track per lift assembly, the bottom abutment device comprising a plate with a ring extending circumferentially around an axis of symmetry (AX2), the plate having one branch per lift assembly, each branch extending radially from the ring towards a free end, wherein the bottom abutment device includes a plurality of supports, each support comprising fastener means for fastening to a rotary member of the rotor, each support extending in part in an opening of a branch so as to co-operate with the branch, the opening extending in elevation in a direction parallel to the axis of symmetry (AX2), the supports giving the plate a degree of freedom to move in translation (TRANS) that is restricted by shape interference with the branches, and the supports giving the plate at least one degree of freedom to move in rotation (ROT) about the axis of symmetry that is restricted by shape interference with the branches.

2. The bottom abutment device according to claim 1, wherein at least one fastener means comprises two elongate members together with two orifices in the support, each elongate member passing through one of the orifices and being designed to pass through a link of the rotor.

3. The bottom abutment device according to claim 1, wherein the supports give the plate three restricted degrees of freedom to move in rotation respectively about the axis of symmetry (AX2) and about two "horizontal" axes (AXR1, AXR2) that are perpendicular to each other and perpendicular to the axis of symmetry (AX2).

4. The bottom abutment device according to claim 1, wherein each support includes a radially-open U-shaped housing, the housing being defined by a top wall and by a bottom wall of the support that are connected together by an end wall of the support extending in elevation, each end wall being arranged in the opening of a branch, the top wall and the bottom wall extending in elevation (direction Z) respectively above and below the branch.

5. The bottom abutment device according to claim 4, wherein the branch co-operating with a support has a plane body, the plane body extending in elevation from a bottom face facing a bottom wall of the support towards a top face facing the top wall of the support, the branch having at least one rim projecting in elevation from the plane body in order to limit a degree of freedom to move of the ring by shape interference.

6. The bottom abutment device according to claim 5, wherein the branch includes at least one rim referred to as a "tangential" rim for limiting movement in translation of the plate, radial clearance lying between the support and each corresponding tangential rim when the axis of symmetry (AX2) of the plate coincides with an axis of rotation (AX1) of the rotor.

7. The bottom abutment device according to claim 5, wherein the branch has at least one pair of rims referred to as "circumferential" rims arranged circumferentially on either side of abutment walls of the support in order to limit the amplitude of movement in rotation for the plate about the axis of symmetry (AX2), circumferential clearance lying between the support and at least one circumferential rim of a pair.

8. The bottom abutment device according to claim 5, wherein the plane body comprises:
   a tangential rim referred to as a "top" tangential rim extending in elevation upwards from the top face, and a pair of circumferential rims referred to as "top" circumferential rims extending in elevation upwards from the top face, the top tangential rim being radially in alignment with the top wall of the support, and the top circumferential rims being arranged circumferentially on either side of the top wall; and
   a tangential rim referred to as a "bottom" tangential rim extending downwards in elevation from the bottom face, and a pair of circumferential rims referred to as "bottom" circumferential rims extending downwards in elevation from the bottom face, the bottom tangential rim being in alignment with the bottom wall of the support, and the bottom circumferential rims being arranged circumferentially on either side of the bottom wall.

9. The bottom abutment device according to claim 5, wherein maximum clearance in elevation between the plane body and the support is less than a height in elevation of a rim.

10. The bottom abutment device according to claim 1, wherein the ring is perforated between two branches.

11. The bottom abutment device according to claim 1, wherein at least one branch includes a wear shoe removably mounted on the free end.

12. The bottom abutment device according to claim 1, wherein the plate is for occupying a middle position (POS1) in the absence of contact with an abutment track, the supports giving the plate a degree of freedom to move in translation perpendicularly to the axis of rotation that is restricted to an amplitude of plus or minus 12 cm about the middle position (POS1), the supports giving the plate a degree of freedom to move in rotation about the axis of symmetry that is restricted to plus or minus 5° about the middle position (POS1).

13. The bottom abutment device according to claim 1, wherein the bottom abutment device includes one support per branch.

14. The bottom abutment device according to claim 1, wherein each abutment track fastens to a lift assembly and faces a free end in order to come into abutment against the free end under predetermined conditions.

15. A rotor having a plurality of lift assemblies, wherein the rotor includes a bottom abutment device according to claim 1, each lift assembly carrying at least one of the abutment track, each support being constrained in rotation with a rotary member of the rotor, the plate being carried by the supports.

16. The rotor according to claim 15, wherein the rotor includes a hub carrying the lift assemblies, and the rotary member is the hub.

17. The rotor according to claim 15, wherein the rotor includes at least three lift assemblies.

18. An aircraft, wherein the aircraft includes a rotor according to claim 15.

19. A bottom abutment device for a rotor having a plurality of lift assemblies for rotating about an axis of rotation, the bottom abutment device comprising at least one abutment track per lift assembly, the bottom abutment device comprising a plate with a ring extending circumferentially around an axis of symmetry, the plate having one branch per lift assembly, each branch extending radially from the ring towards a free end, wherein the bottom abutment device includes a plurality of supports, each support comprising a rotary member fastener, each support extending at least in part in an opening of a branch, the opening extending in elevation in a direction parallel to the axis of symmetry, the supports giving the plate a degree of freedom to move in translation that is restricted by shape interference with the branches, and the supports giving the plate at least one degree of freedom to move in rotation about the axis of symmetry that is restricted by shape interference with the branches.

20. A bottom abutment device for a rotor having a plurality of lift assemblies for rotating about an axis of rotation, the bottom abutment device comprising at least one abutment track per lift assembly, the bottom abutment device comprising a plate with a ring extending circumferentially around an axis of symmetry, the plate having one branch per lift assembly, each branch extending radially from the ring towards a free end, wherein the bottom abutment device includes a plurality of supports, each support fastenable to a rotary member of the rotor, each support extending in an opening of a branch to co-operate with the branch, the opening extending in elevation, the supports giving the plate a degree of freedom to move in translation restricted by interference with the branches, and the supports giving the plate at least one degree of freedom to move in rotation about the axis of symmetry restricted by interference with the branches.

* * * * *